(12) United States Patent
Hatakenaka et al.

(10) Patent No.: US 7,237,175 B2
(45) Date of Patent: Jun. 26, 2007

(54) MEMORY CIRCUIT

(75) Inventors: Makoto Hatakenaka, Tokyo (JP); Koji Nii, Tokyo (JP); Atsuo Mangyo, Tokyo (JP); Takeshi Fujino, Tokyo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 452 days.

(21) Appl. No.: 10/193,319

(22) Filed: Jul. 12, 2002

(65) Prior Publication Data

US 2003/0046632 A1 Mar. 6, 2003

(30) Foreign Application Priority Data

Aug. 31, 2001 (JP) ............................. 2001-264316

(51) Int. Cl.
*G11C 29/00* (2006.01)

(52) U.S. Cl. ..................... 714/766; 714/763; 714/773

(58) Field of Classification Search ........ 714/762–764, 714/768
See application file for complete search history.

(56) References Cited

U.S. PATENT DOCUMENTS

| | | | | |
|---|---|---|---|---|
| 4,618,943 A | * | 10/1986 | Aipperspach et al. | ........ 365/104 |
| 4,665,537 A | * | 5/1987 | Moriyama | ................... 714/755 |
| 5,450,424 A | * | 9/1995 | Okugaki et al. | ............. 714/772 |

(Continued)

FOREIGN PATENT DOCUMENTS

| | | |
|---|---|---|
| CN | 1278647 | 1/2001 |
| JP | 07-045095 | 2/1995 |
| TW | 388009 | 4/2001 |
| WO | WO 01/02959 | 1/2001 |
| WO | WO 01/02959 | * 1/2002 |

OTHER PUBLICATIONS

Kiyohiro Furutani et al., "A Built-In Hamming Code ECC Circuit for DRAM's", IEEE Journal of Solid-State Circuits, vol. 24, No. 1, Feb. 1989, pp. 50-56.

(Continued)

*Primary Examiner*—Guy Lamarre
*Assistant Examiner*—Steve Nguyen
(74) *Attorney, Agent, or Firm*—Buchanan Ingersoll & Rooney PC

(57) ABSTRACT

When to a memory cell array 21 a read/write operation is performed of the 7-bit data in which parity bits of 3 bits are added to data of 4 bits, an error correction is carried out in concern to each of the 7-bit data. The memory cell array is divided into memory units 31 to 37 each of which has four bits which are arranged along a direction of a word line. On writing the 7-bit data in the memory cell array, bits of the 7-bit data that are different from one another are written as written bit data along the direction of the word line in the memory units 31 to 37, respectively. In the 7-bit data, the written bit data has an interval of four bits. Error correcting circuits performs an error correction of the 7-bit data in each of the 7-bit data.

3 Claims, 7 Drawing Sheets

U.S. PATENT DOCUMENTS

| | | |
|---|---|---|
| 5,671,239 A | 9/1997 | Higashitani et al. |
| 5,862,097 A * | 1/1999 | Toda ..................... 365/230.03 |
| 5,991,201 A * | 11/1999 | Kuo et al. ............. 365/185.19 |
| 6,065,146 A * | 5/2000 | Bosshart ..................... 714/754 |
| 6,223,322 B1 | 4/2001 | Michigami et al. |
| 6,785,835 B2 * | 8/2004 | MacLaren et al. ............. 714/6 |

OTHER PUBLICATIONS

Hyungsoon Shin, "Modeling of Alpha-Particle-Induced Soft Error Rate in DRAM", IEEE Transactions of Electron Devices, vol. 46, No. 9, Sep. 1999, pp. 1850-1857.

* cited by examiner

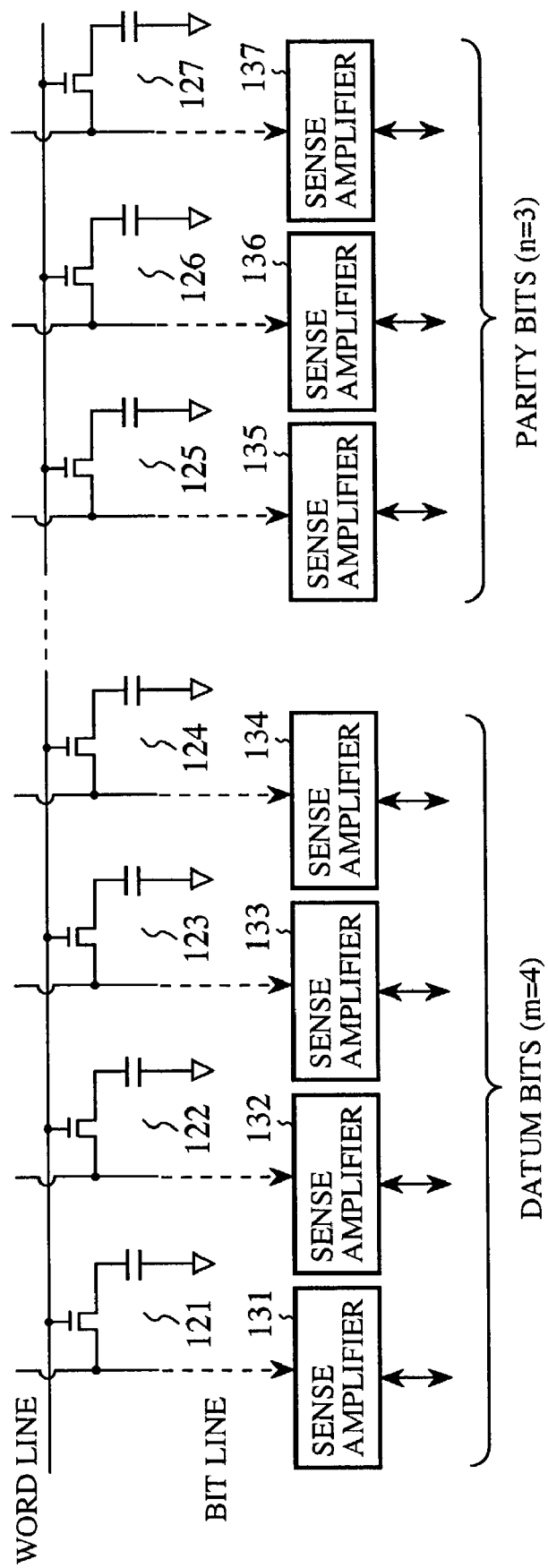

MEMORY CIRCUIT

BACKGROUND OF THE INVENTION

1. Field of the Invention

This invention relates to a memory circuit having an error correcting function, and more particularly, to a memory circuit which is tough to a multi-bit error in which a plurality of bit errors generates locally.

2. Description of the Prior Art

FIG. 7 is a circuit configuration for illustrating a conventional memory circuit having an error correcting function (hereinafter, simply called memory circuit). In FIG. 7, a reference numeral 11 represents a memory cell array. A reference numeral 12 represents a memory cell. A reference numeral 13 represents a sense amplifier circuit. A reference numeral 14 represents an ECC (Error Check and Correction) circuit. In such a memory circuit, parity bits of n bits are added to data of m bits, where n represents a positive integer which is not less than one, and m represents a positive integer which is not less than two. When an error occurs in at least one bit on carrying out a read/write operation for the memory cell array 11, the ECC circuit 14 carries out a correction of the error bit.

Next, the description will be given of an operation of the memory circuit illustrated in FIG. 7.

In the example being illustrated, the memory circuit illustrated in FIG. 7 has m=4 and n=3. BCH codes are used as error correcting codes. The parity bits of three bits are added to the data of four bits. The read/write operation is carried out for the memory cell array 11 in unit of the data of seven bits in sum. When a specific one of word lines is selected as a selected word line and the read/write operation is carried out for the memory cell array 11, the data of 7 bits are read from and written to seven memory cells 12 which are adjacent to one another. In FIG. 7, the adjacent seven memory cells will be collectively called a memory block.

On a read operation, the data of 7 bits are read out of each of a plurality of memory blocks which correspond to the selected word line. The data of 7 bits are supplied to the ECC circuits 14 through the sense amplifier circuits 13, respectively. In other words, the data of 7 bits are supplied to each of the ECC circuits 14. When an error bit or error bits exist in the data of 7 bits, each of the ECC circuits 14 corrects the data in accordance with the parity bits to output the data of 4 bits as read data.

On the other hand, writing data of 4 bits are supplied to each of the ECC circuits 14 on a write operation. Each of the ECC circuits 14 adds the parity bits of three bits to the writing data to output writing data of 7 bits. Through the sense amplifier circuits 13, the writing data of 7 bits are written to the memory blocks which correspond to the selected word line, respectively.

FIG. 8 shows a view for illustrating a memory block of an SRAM. The memory block has seven memory cells 12a to 12g. The memory cells 12a to 12g are connected to the sense amplifiers 13a to 13g through bit lines, respectively. Through the sense amplifiers 13a to 13d, datum bits are read from and written to the memory cells 12a to 12d, respectively. Furthermore, parity bits are read from and written to the memory cells 12e to 12g, respectively, through the sense amplifiers 13e to 13g.

The description will be given of a read/write operation for the SRAM illustrated in FIG. 8. At first, the data of 7 bits are read out of the SRAM. At that time, the data of 7 bits are supplied to the ECC circuits, respectively, in order to carry out the error check and correction, as described above. When the data of 7 bits have error bits whose number is not less than two, errors may be included in the corrected datum bits and the corrected parity bits. Under the circumstances, each of the ECC circuits outputs 2 bits error detection flag. Responsive to the 2 bits error detection flag, the SRAM is reset.

On the other hand, each of the ECC circuits does not output the 2 bits error detection flag when 1 bit error occurs. Each of the ECC circuits corrects the datum bits or the parity bits to produce corrected datum bits or corrected parity bits. Thereafter, that processing continues with using the corrected datum bits. The corrected datum bits and the corrected parity bits (corrected data of 7 bits) are written in the SRAM. Furthermore, the data of 7 bits are again read out of the SRAM to be processed in a similar manner described above, when it is necessary to read the data out of the SRAM.

FIG. 9 shows a view for illustrating a memory block of a DRAM. The memory block has seven memory cells 121 to 127. The memory cells 121 to 127 are connected to the sense amplifiers 131 to 137 through bit lines, respectively. Through the sense amplifiers 131 to 134, datum bits are read from and written to the memory cells 121 to 124, respectively. Furthermore, parity bits are read from and written to the memory cells 125 to 127, respectively, through the sense amplifiers 135 to 137.

In the DRAM illustrated in FIG. 9, the error check and correction is carried out in a manner similar to the SRAM illustrated in FIG. 8.

By the way, the above-mentioned data error (bit error) may locally occur. Such a data error may be called a soft error. More particularly, a pair of electron and hole generates when alpha ray or neutron ray is plunged into the semiconductor substrate. The alpha ray may be released from a semiconductor material of the semiconductor substrate. The neutron ray occurs in nature. When the electron is absorbed into a latch node of the memory cell, the datum is destroyed in the memory cell so that the soft error occurs. In the other words, the soft error is an error in which the data are locally destroyed in only parts into which the alpha ray or the neutron ray is plunged. On the basis of the cause of error, the soft error will be called an alpha ray soft error or a neutron ray soft error.

A plurality of soft errors may occur locally and simultaneously by one plunge of the alpha ray or the neutron ray. The above-mentioned errors will be called a multi-bit soft error.

Recently, the amount of the accumulated charge becomes low in a memory node of the memory cell in the SRAM, as a semiconductor integrated circuit becomes fine. For example, the amount of the accumulated charge is reduced to a level of 5f-coulombs in 0.18 µm-generation. In as much as electrons, which are generated in the semiconductor substrate by each particle of the alpha ray and the neutron ray, have charges of 20 f-coulombs to 200 f-coulombs, there is a growing possibility that errors simultaneously occur in adjacent memory cells by the plunge of one particle.

Inasmuch as the data of (m+n) bits are read out of the memory cells of (m+n) that are adjacent to one another, in the conventional memory circuit, there is a drawback in which makes it impossible to correct the errors when the multi-bit soft error occurs in which a plurality of bit errors generates locally and simultaneously, as described above. In other words, there is a drawback in which makes it impossible to correct the errors when bit errors having a bit number greater than a correctable one occur simultaneously due to the multi-bit soft error.

For example, there is a drawback in which it is impossible to correct the errors when the errors simultaneously occur in two bits due to the multi-bit soft error in the adjacent data of 7 bits as described above.

SUMMARY OF THE INVENTION

In order to solve the above-mentioned drawbacks, it is an object of this invention to provide a memory circuit capable of correct errors even if a multi-bit soft error occurs in which a plurality of bit errors generates locally and simultaneously.

A memory circuit according to this invention includes a memory cell array having a plurality of memory cells which are arranged in the memory cell array. The memory circuit further comprises error correcting means for correcting an error in each of (m+n) bit data when a read/write operation is carried out in concern to the (m+n) bit data in which parity bits of n bits are added to data of m bits, where m represents a positive integer which is not less than two and n represents a positive integer which is not less than one. The memory cell array is divided into a plurality of memory units each of which has bits of a predetermined number K that are arranged along a direction of a word line, where K represents a positive integer which is not less than two. Each bit of the (m+n) bit data is written in each of the memory units along the word line with an interval of the predetermined number K, on writing the (m+n) bit data in the memory cell array. The error correcting means carries out an error correction in concern to the (m+n) bit data whose bits different from one another are written in the memory units, respectively.

BRIEF DESCRIPTION OF THE DRAWINGS

FIG. 9 shows a view for illustrating an example of a DRAM.

DETAILED DESCRIPTION OF THE PREFERRED EMBODIMENTS

An embodiment of the present invention will be described below.

Embodiment 1

Figure 1:
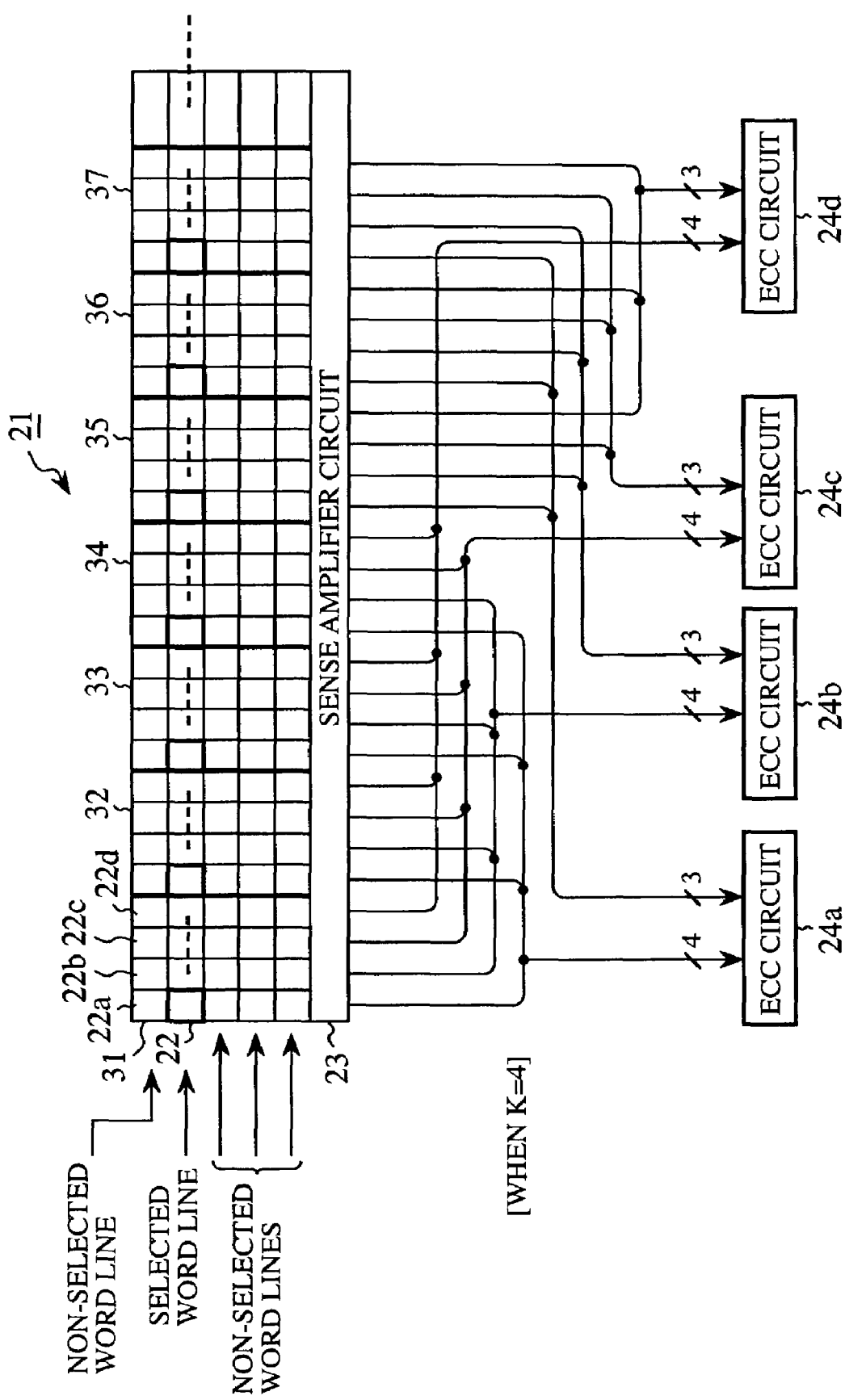
FIG. 1 is a circuit configuration for illustrating a memory circuit according to an embodiment 1 of this invention.

In FIG. 1, a reference numeral 21 represents a memory cell array. A reference numeral 22 represents a memory cell.

A reference numeral 23 represents a sense amplifier circuit. Reference numerals 24a to 24d represent ECC circuits, respectively (Each of the ECC circuits 24a to 24d serves as an error correcting section). Data of (m+n) bits are read from and written to the memory cell array 21. The data of (m+n) bits are obtained by adding parity bits of n bits to data of m bits. The memory cell array 21 is divided into K bits arranged along a direction of a word line, where K represents a positive integer which is not less than two. Each unit having the K bits arranged along the direction of the word line will be called a memory unit. Successive memory units of (m+n) form a memory block. In the example being illustrated, K=4, m=4, and n=3. Each of the memory units is divided into 4 bits. The successive seven memory units form one memory block.

In FIG. 1, the memory units are designated by reference numerals 31 to 37 in the direction from left to right. In each of the memory units 31 to 37, memory cell groups arranged along a row or column (the direction of the bit line) are designated by reference numerals 22a to 22d, respectively, in the direction from left to right. The memory cell groups 22a to 22d will be called first to fourth rows, respectively. In the example being illustrated, the datum bits are written in the memory units 31 to 34 and the parity bits are written in the memory units 35 to 37.

The ECC circuit 24a is connected to the first row 22a of each of the memory units 31 to 37 through the sense amplifier circuit 23. In addition, the ECC circuit 24b is connected to the second row 22b of each of the memory units 31 to 37 through the sense amplifier circuit 23. Similarly, the ECC circuits 24c and 24d are connected to the third and the fourth rows 22c and 22d of each of the memory units 31 to 37, respectively, through the sense amplifier circuit 23.

Next, the description will proceed to an operation of the memory circuit illustrated in FIG. 1.

As not depicted in FIG. 1, each of the word lines is connected to a word line driver which is connected to an address decoder. The address decoder is supplied with addresses and a clock signal. On the read/write operation, one of the addresses is taken as a selected address in the address decoder. The word line driver drives one of the word lines that corresponds to the selected address, as a selected word line. The memory cells 22 connected to the selected word line are coupled to a data mount (not shown) through bit lines to sense amplifier circuit 23. The data are inputted to and outputted from the ECC circuits 24a to 24d.

It will be assumed that one of the word lines is selected as the selected word line and that first to seventh 7-bit data are written in the memory cells arranged along the selected word line. Each of the first to seventh 7-bit data has the data of 4 bits and the parity bits of 3 bits. Each of the first to fourth bits represents a datum bit and each of the fifth to seventh bits represents a parity bit. On the write operation, the ECC circuit 24a supplies the first 7-bit data to the memory block. Through the sense amplifier circuit 23, the first to seventh bits of the first 7-bit data are written in the memory cells 22 positioned or located at the first rows 22a of the memory units 31 to 37 (memory cells 22 arranged along the selected word line), respectively.

In addition, the ECC circuit 24b supplies the second 7-bit data to the memory block. Through the sense amplifier circuit 23, the first to seventh bits of the second 7-bit data are written in the memory cells 22 positioned at the second rows 22b of the memory units 31 to 37, respectively.

Similarly, the ECC circuit 24c supplies the third 7-bit data to the memory block. Through the sense amplifier circuit 23, the first to seventh bits of the third 7-bit data are respectively written in the memory cells 22 positioned at the third rows 22c of the memory units 31 to 37. Furthermore, the ECC circuit 24d supplies the fourth 7-bit data to the memory block. Through the sense amplifier circuit 23, the first to seventh bits of the fourth 7-bit data are written in the memory cells 22 positioned at the fourth row 22d of the memory units 31 to 37, respectively.

On writing the first to fourth 7-bit data in the memory block as described above, the first to seventh bits of the first 7-bit data are written in the memory cells positioned at the first rows 22a of the memory units 31 to 37, respectively, when attention will be directed to the first 7-bit data. As a result, the first to seventh bits of the first 7-bit data are written in the memory block, apart from one another with an interval of 4 bits. Similarly, the first to seventh bits are written in the memory block apart from one another with an interval of 4 bits with respect to the second to fourth 7-bit data.

Under the circumstances, the multi-bit soft error may occur in which a plurality of bit errors generate locally and simultaneously, when the alpha ray or the neutron ray having one particle is plunged into the memory cell array 21. In other words, errors may simultaneously occur in a plurality of memory cells which are adjacent to one another. In this event, there are hardly occurrences of errors in a plurality of bits of the same 7-bit data inasmuch as bits are written in the memory block apart from one another with the interval of 4 bits, in concern to each of the 7-bit data in the memory circuit illustrated in FIG. 1. In other words, errors do not occur in a plurality of bits of the same 7-bit data when the successive number of bits which become errors is less than four.

The number of bit errors practically is one even if the bit errors occur in each of the first to fourth 7-bit data. As a result, the error check and correction is not impossible in each of the ECC circuits 24a to 24d on the read operation. In other words, the multi-bit soft error hardly occurs in which the error check and correction is impossible.

Embodiment 2

Figure 2:
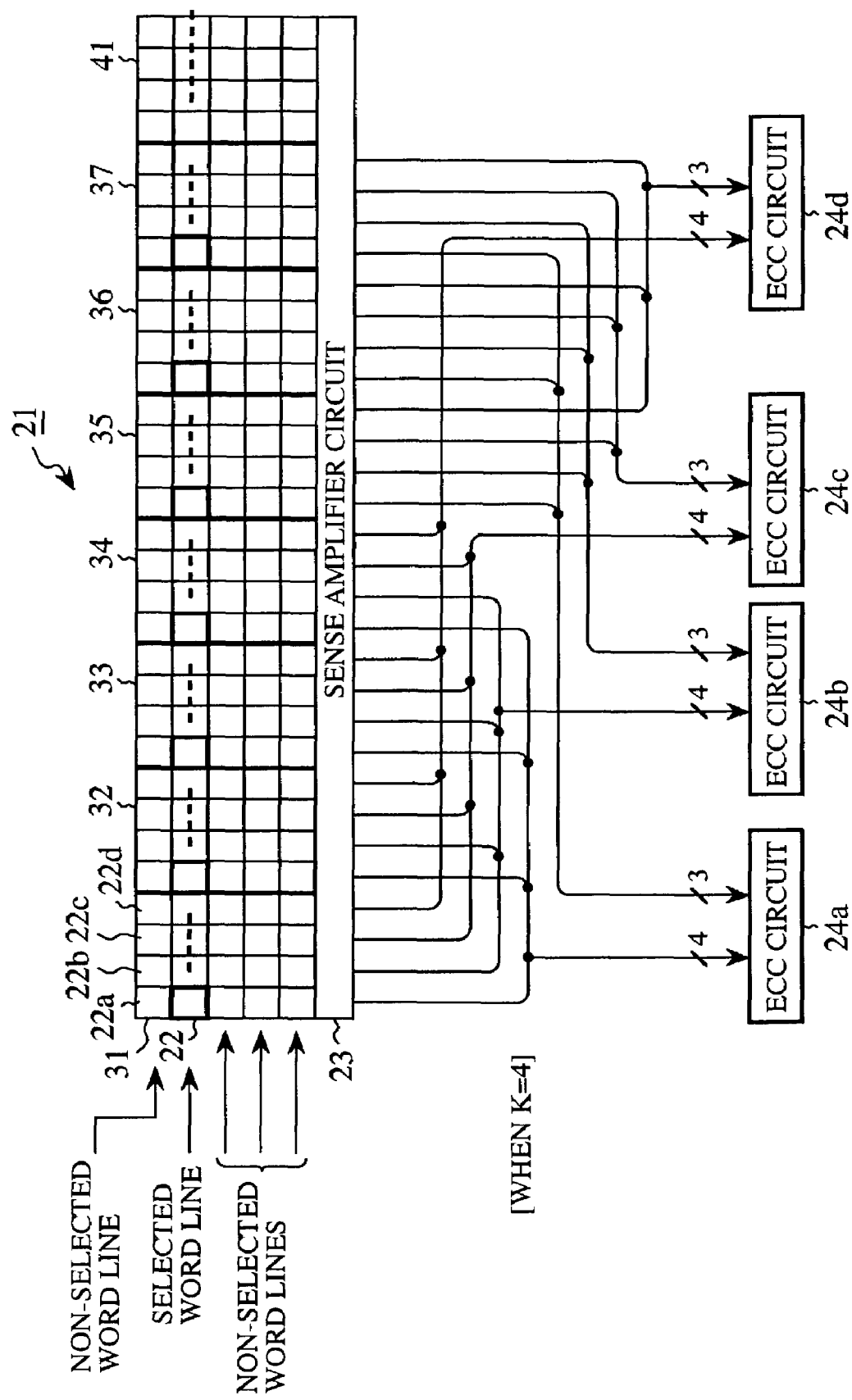
FIG. 2 is a circuit configuration for illustrating a memory circuit according to an embodiment 2 of this invention.

In FIG. 2, the same components as those of FIG. 1 are designated by the same reference numerals. A reference numeral 41 represents a spare memory unit (redundant memory unit). The spare memory unit 41 is similar in structure to each of the memory units 31 to 37. In other words, the spare memory unit 41 has memory cells 22 of 4 bits that are arranged along the word line. It will be assumed that a memory cell failure occurs in the memory unit 36 (for example, a defect based on manufacturing). The memory unit 36 is displaced with the spare memory unit 41. The first through the fourth rows 22a to 22d of the spare memory unit 41 are connected to the ECC circuits 24a to 24d, respectively.

A selection switch is used on displacing the memory unit 36 with the spare memory unit 41. More particularly, a laser repair fashion is used which sets the selection switch by a laser cutting. Although illustration is not made in FIG. 2, a laser repair fuse is cut so that a selector selects the spare memory unit 41. As a result, the memory unit 36 is not used and the memory unit 36 is displaced with the spare memory unit 41. In general, it is known to displace a failure memory with a spare memory when a memory cell failure occurs.

As shown in FIG. 2, when the displacements are carried out by memory unit in a case where the memory cell failure occurs, errors hardly occur in a plurality of bits of the same 7-bit data in as much as bits are written in the memory block apart from one another with the interval of 4 bits, in concern to each of the 7-bit data, after displacement. As a result, the multi-bit soft error hardly occurs in which the error check and correction is impossible.

Figure 3:
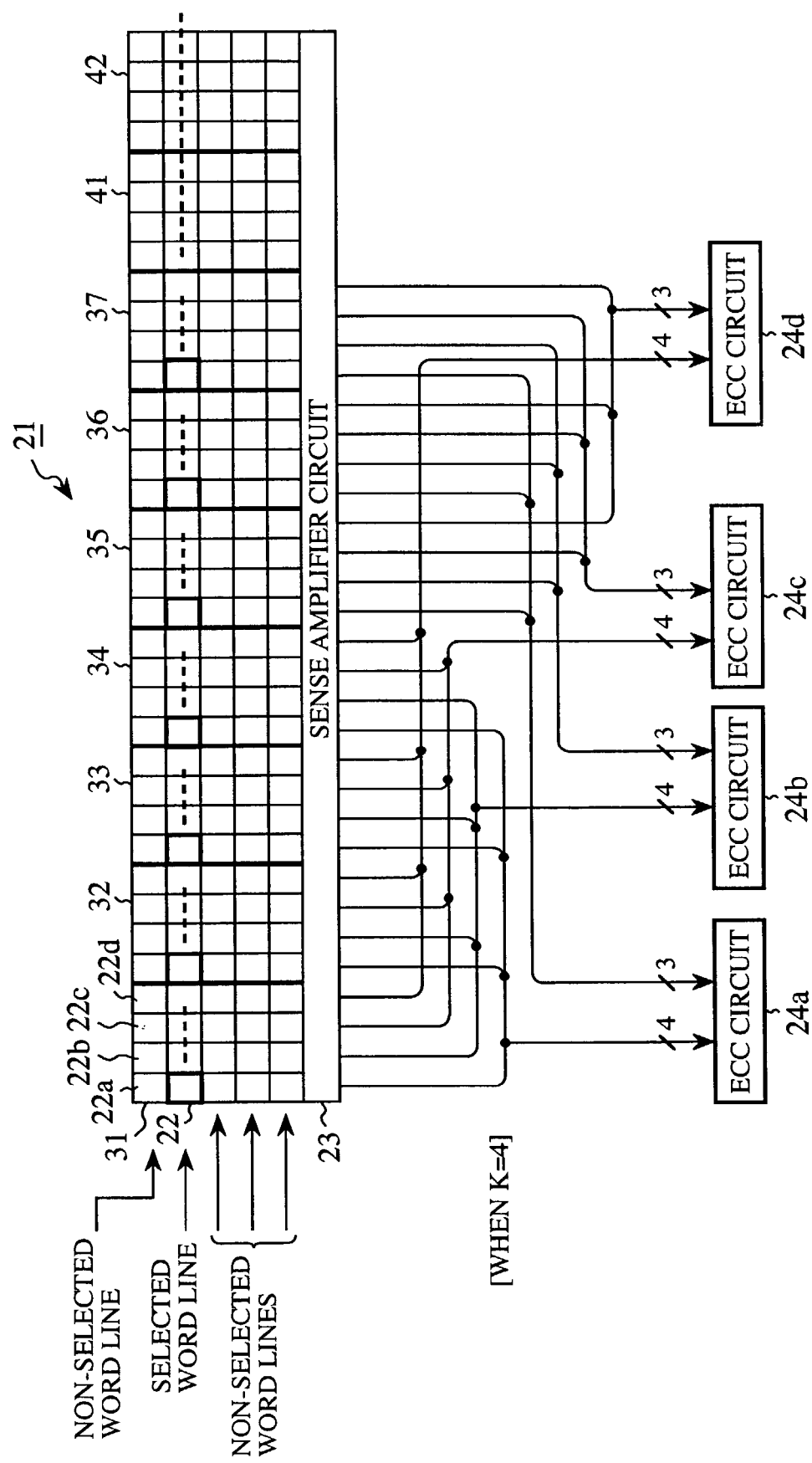
FIG. 3 is a circuit configuration for illustrating another example of a memory circuit according to the embodiment 2 of this invention.

Furthermore, displacements are carried out in an integral multiple of the number of failure memory units in case where the memory cell failure occurs in a plurality of memory units. More specifically, the memory units 35 and 36 are displaced with the spare memory units 41 and 42, respectively, in case where the memory cell failure occurs in each of the memory units 35 and 36 as shown in FIG. 3. In this case, the ECC circuits 24a to 24d are connected to the first through the fourth rows 22a to 22d of each of the spare memory units 41 and 42, respectively.

Embodiment 3

Figure 4:
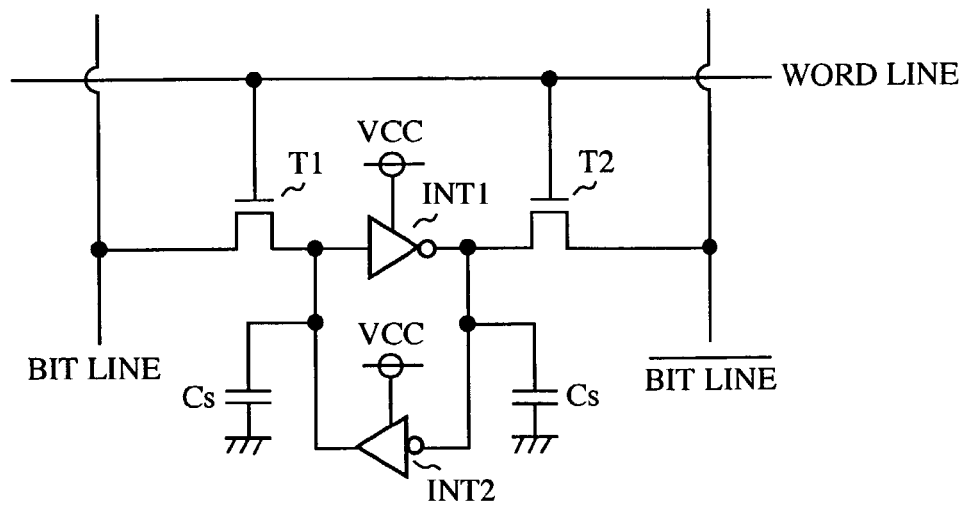
FIG. 4 shows a view for illustrating an example of a memory cell (SRAM cell) which is used in a memory circuit according to an embodiment 3 of this invention.

FIG. 4 shows a view for illustrating an example of a memory cell (SRAM cell) of an SRAM. T1 and T2 represent transistors, respectively. INT1 and INT2 represent inverters, respectively. A latch circuit is composed of the inverters INT1 and INT2 of two stages. A capacitance (including a parasitic capacitance) is given by Cs on a latch node. When each of the inverters INT1 and INT2 is supplied with a power voltage of Vcc, an accumulated charge is given by Cs×Vcc (coulombs).

When −Q (coulombs) represents a charge of an electron which generates on plunging the particle of the alpha ray or the neutron ray into the semiconductor substrate, the positive integer K' which satisfies a relationship of K'>Q/(Cs× Vcc) is used as a division number.

The above-mentioned division number K' represents a distance (worst value) between error bits which cause the memory circuit a data error, in case where the particle is plunged parallel to the word line. The multi-bit soft error hardly occurs on using the division number K' which is calculated as described above.

Embodiment 4

Figure 5:
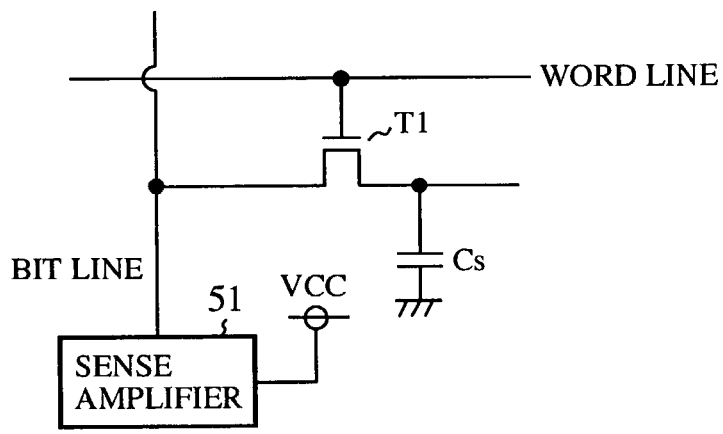
FIG. 5 shows a view for illustrating an example of a memory cell (DRAM cell) which is used in a memory circuit according to an embodiment 4 of this invention.

FIG. 5 shows a view for illustrating an example of a memory cell (DRAM cell) of a DRAM. T1 represents a transistor. Cs represents a capacitor. The capacitor Cs includes a parasitic capacitance. When the sense amplifier 51 connected to the bit line is supplied with a power voltage of Vcc, an accumulated maximum charge is given by Cs×Vcc (coulombs).

When −Q (coulombs) represents a charge of an electron which generates on plunging the particle of the alpha ray or the neutron ray into the semiconductor substrate, the positive integer K' which satisfies a relationship of K'>Q/(Cs× Vcc) is used as a division number.

The division number K' described in Fig.5 represents a distance (worst value) between error bits which cause the memory circuit a data error, in case where the particle is plunged parallel to the word line. The multi-bit soft error hardly occurs on using the division number K' which is calculated as described above.

Embodiment 5

Figure 6:
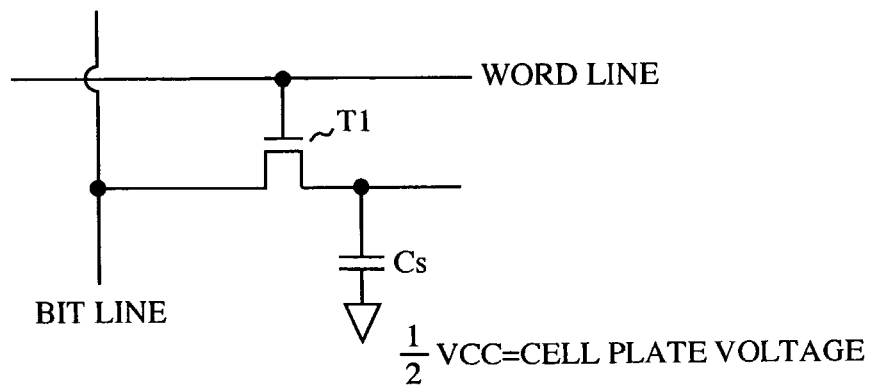
FIG. 6 shows a view for illustrating an example of a memory cell (DRAM cell) which is used in a memory circuit according to an embodiment 5 of this invention.
Figure 7:
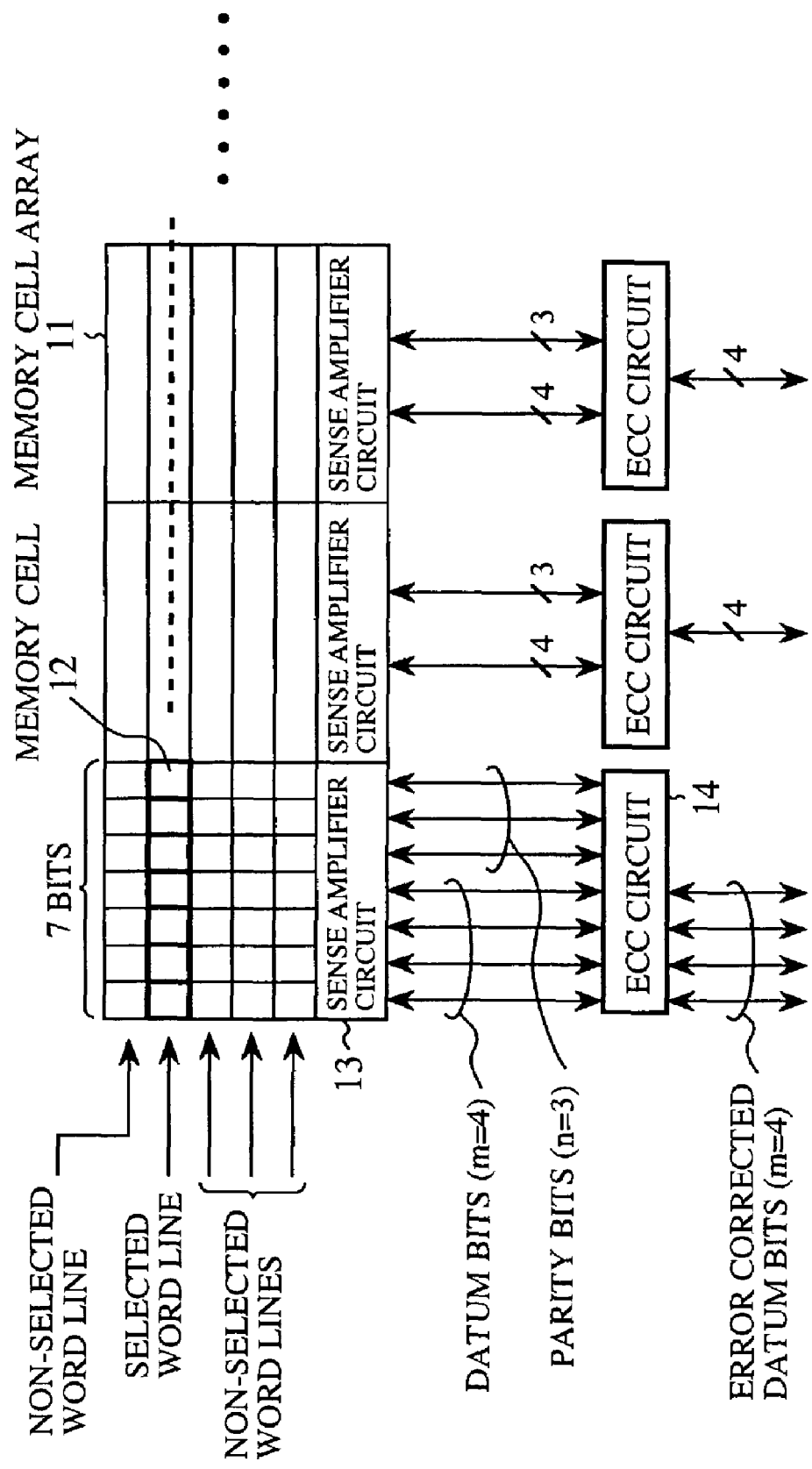
FIG. 7 is a circuit configuration for illustrating a conventional memory circuit.
Figure 8:
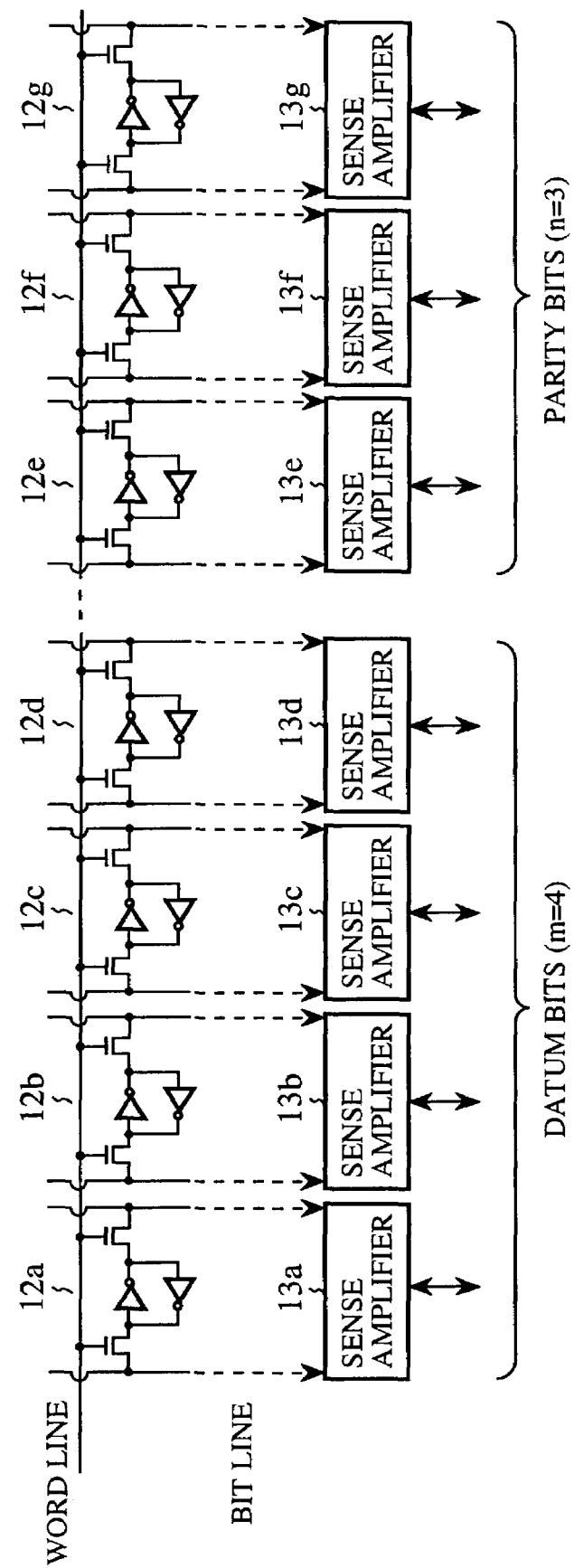
FIG. 8 shows a view for illustrating an example of a SRAM.

FIG. 6 shows a view for illustrating another example of a memory cell (DRAM cell) of a DRAM. T1 represents a transistor. Cs represents a capacitor. The capacitor Cs includes a parasitic capacitance. It will be assumed that the sense amplifier (not shown) connected to the bit line is supplied with a power voltage of Vcc. Furthermore, it will be assumed that a cell plate voltage of the DRAM cell is equal to Vcc/2. An accumulated maximum charge is given by Cs×Vcc/2 (coulombs).

When −Q (coulombs) represents a charge of an electron which generates on plunging the particle of the alpha ray or the neutron ray into the semiconductor substrate, the positive integer K' which satisfies a relationship of K'>Q/(Cs×Vcc/2) is used as a division number.

The division number K' described in Fig.6 represents the distance (worst value) between error bits which cause the memory circuit a data error, in case where the particle is plunged parallel to the word line. The multi-bit soft error hardly occurs on using the division number K' which is calculated as described above.

What is claimed is:

1. A memory circuit comprising:
   a memory cell array having a plurality of memory cells which are arranged in said memory cell array,
   error correcting means for correcting an error in each of (m+n) bit data when a read or write operation is carried out for said (m+n) bit data in which parity bits of n bits are added to data of m bits, where m represents a positive integer which is not less than two, and n represents a positive integer which is not less than one, wherein
   said memory cell array is divided into a plurality of memory units each of which has bits of a predetermined number K that are arranged along a direction of a word line, where K represents a positive integer which is not less than two;
   each bit of said (m+n) bit data being written in each of said memory units along said word line and separated from each other along said word line by an interval of said predetermined number K, when said (m+n) bit data is written in said memory cell array; and
   said error correcting means carrying out an error correction for said (m+n) bit data whose parity and data bits are written in said memory units, respectively, wherein said predetermined number K represents a worst value between error bits which cause a data error and is given by a relationship of K>Q/(Cs×Vcc), where Cs (farads) represents a capacitance in a latch node of each memory cell, Vcc (volts) representing an operating voltage of each memory cell, and −Q (coulombs) representing a charge of an electron in a pair of electron and hole produced by particles which causes said memory circuit a multi-bit soft error in which a plurality of bit errors generates locally and simultaneously.

2. A memory circuit according to claim 1, wherein said memory cell is either one of an SRAM cell or a DRAM cell.

3. A memory circuit comprising:
   a memory cell array having a plurality of memory cells which are arranged in said memory cell array,
   error correcting means for correcting an error in each of (m+n) bit data when a read or write operation is carried out for said (m+n) bit data in which parity bits of n bits are added to data of m bits, where m represents a positive integer which is not less than two, and n represents a positive integer which is not less than one, wherein
   said memory cell array is divided into a plurality of memory units each of which has bits of a predetermined number K that are arranged along a direction of a word line, where K represents a positive integer which is not less than two;
   each bit of said (m+n) bit data being written in each of said memory units along said word line and separated from each other along said word line by an interval of said predetermined number K, when said (m+n) bit data is written in said memory cell array; and
   said error correcting means carrying out an error correction for said (m+n) bit data whose parity and data bits are written in said memory units, respectively, wherein:
   said memory cell is a DRAM cell; and
   said predetermined number K represents a worst value between error bits which cause a data error and is given by a relationship of K>Q/(Cs×Vcc/2), where Cs (farads) represents a capacitance in a latch node of each memory cell, Vcc (volts) representing an operating voltage of each memory cell, a cell plate of said DRAM being biased by ½×Vcc, and −Q (coulombs) representing a charge of an electron in a pair of electron and hole produced by particles which causes said memory circuit a multi-bit soft error in which a plurality of bit errors generates locally and simultaneously.

* * * * *